Feb. 3, 1942. J. C. MULLEN 2,271,948

TAP BUSH

Filed July 10, 1939

INVENTOR
JAMES C. MULLEN
BY
ATTORNEY

Patented Feb. 3, 1942

2,271,948

UNITED STATES PATENT OFFICE 2,271,948

TAP BUSH

James C. Mullen, Cliffside Park, N. J., assignor to Verdi Bros. Cooperage Company, North Bergen, N. J., a corporation of New Jersey Application July 10, 1939, Serial No. 283,647

2 Claims. (Cl. 220—113)

This invention relates to tap bushings for barrels more particularly those which are subjected to considerable gaseous pressure such as beer barrels.

The present invention is more particularly applicable to the type of barrel as disclosed in a copending application of James C. Mullen, filed June 19, 1939, Serial No. 279,783, for Beer barrels, although it can be used with the conventional barrel. In either the solid stave and head type of construction or the laminated construction above referred to, the ends of the fibres or lamination engaged by the threads of the bushing tend to open up by the thread formation in the opening accentuated by the gaseous pressure tending to force the threaded bush outwardly. An undesirable condition of the barrel structure ensues by reason of the crevices formed between the spread ends of the fibres or lamination as the case may be.

To overcome this condition and to provide a simplified and effective tap bushing is one of the objects of the present invention.

Other objects will become apparent as the description of the particular embodiments chosen to illustrate the invention progresses.

More generally stated the invention comprises a tap bushing firmly clamping the opposite circumferential sides of the barrel part not only to hold the bushing firmly in place but to clamp together the ends of the fibres or laminations.

More specifically stated the invention comprises a tap bush having an auxiliary ring or flange adapted to be secured to the bushing by rolling or peening down the projecting edge of an upstanding continuation of the cylindrical threaded portion of the bush over the ring or flange to provide two oppositely disposed annular flanges with a threaded cylindrical portion between the flanges, the flanges overlying opposite sides of the barrel part and preventing spread of the ends of the laminations or fibres.

While one embodiment of this invention is illustrated in the accompanying drawing, it is to be understood that such embodiments merely serve as an illustration of the underlying principles of the invention so that it may be readily comprehended by those skilled in the art, and is not intended as limiting the invention to the specific details disclosed therein.

Figure 1:
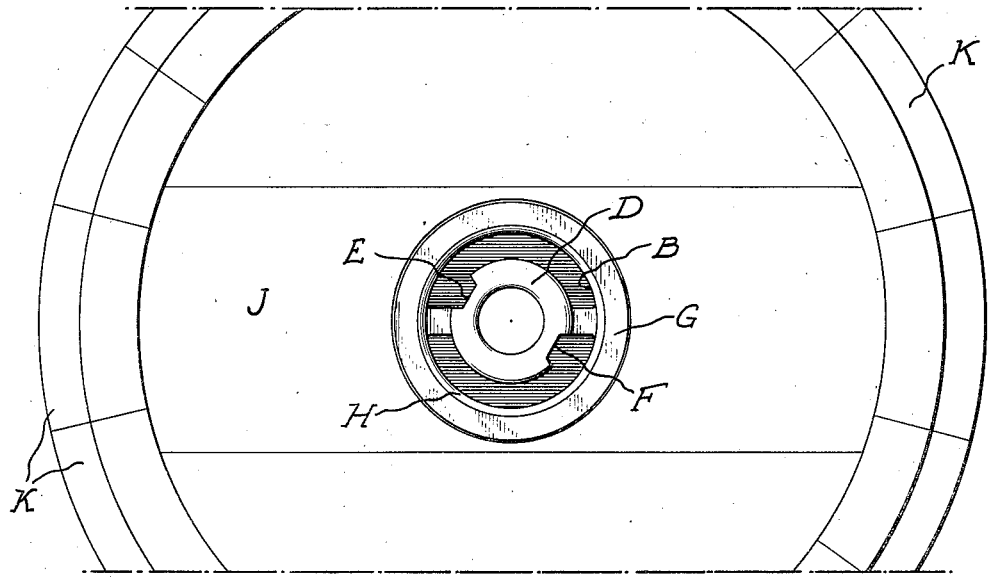
Fig. 1 is a top plan view of the invention as applied to a barrel head.
Figure 2:
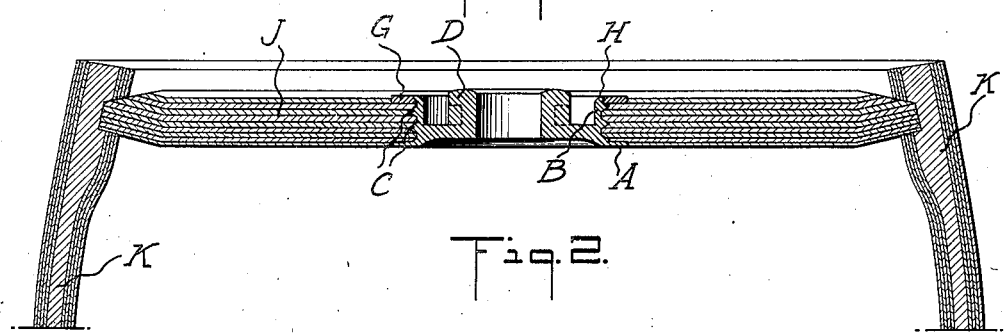
Fig. 2 is a vertical section of the invention as applied to a laminated barrel and stave construction.
Figure 3:
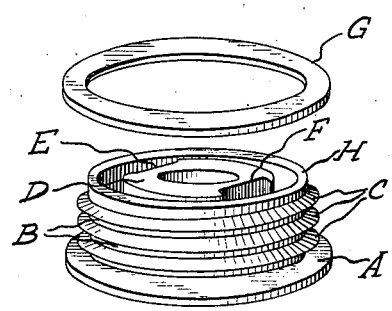
Fig. 3 shows the invention disassembled.

Continuing now by way of a more detailed description:

The bushing comprises a lower annular flange A preferably integrally formed with an upstanding hollow cylindrical portion B of smaller diameter than the diameter of the flange. This cylindrical portion is threaded at C with relatively deep threads to engage corresponding threads formed in the bush receiving opening in the barrel head. A capstan head D axially disposed in the threaded cylindrical portion C has oppositely disposed tool engaging openings E and F for conveniently rotating the bush and screwing it into place. The hollow cylindrical portion B is projected upwardly to form a thin sleeve or extension piece B' forming a seat for an auxiliary flange or ring G adapted to be slipped over the extension piece B' and resting on the top of the threads. When the flange G is seated the portion H of the extension B' extends slightly above the flange and may be rolled over to lock the flange G to the bush and simultaneously clamp the opposite circumferential edges of the head J supported in suitable barrel staves K. The foregoing arrangement provides an arrangement in which the annular flange A is located on the inside of the barrel so that the gaseous pressure tending to force the bush outwardly forces the bush flange A against the barrel part. The ring G which is forced firmly against the opposite side of the barrel part by the crimping or rolling action not only effectively prevents leakage but slightly compresses the ends of the board whether solid or laminated to prevent deterioration by seepage of the barrel contents into the board ends.

It is claimed:

1. A barrel element having a tap hole therethrough, a tubular bushing set into said hole and extending therein from one to the other side of the barrel element, and means for holding the bushing against displacement, comprising a coarse screw thread formed on the exterior wall of the bushing, a complementary thread in that wall of the barrel element which defines the tap hole, in screw engagement with the thread on the bushing, a flange on the bushing set to one side of the barrel element by screwing of the bushing into the tap hole, a tubular extension of the bushing beyond the other side of the barrel element, a ring embracing said extension, set to the face of the barrel element, and a peened portion of said tubular extension overlying the outside face of the ring whereby to clamp the bushing to the barrel element and to lock the same against rotary movement.

2. A laminated barrel element having a tap hole therethrough, a tubular bushing set into said hole and extending therein from one to the other side of the barrel element, and means for holding the bushing against displacement, comprising a screw thread, having its convolutions pitched apart a distance greater than the thickness of the laminations of the barrel element, formed on the exterior wall of the bushing, a complementary thread in that wall of the barrel element which defines the tap hole, in screw engagement with the thread on the bushing, a flange on the bushing set to one side of the barrel element by screwing of the bushing into the tap hole, a tubular extension of the bushing beyond the other side of the barrel element, a ring embracing said extension, set to the face of the barrel element, and a peened portion of said tubular extension overlying the outside face of the ring whereby to clamp the bushing to the barrel element and to lock the same against rotary movement.

JAMES C. MULLEN